P. R. DUCHEMIN.
SELECTIVE SPEED GEARING.
APPLICATION FILED MAY 29, 1916.

1,248,635.

Patented Dec. 4, 1917.
2 SHEETS—SHEET 1.

Inventor
P. R. Duchemin.

By

Attorneys

P. R. DUCHEMIN.
SELECTIVE SPEED GEARING.
APPLICATION FILED MAY 29, 1916.
1,248,635.
Patented Dec. 4, 1917.
2 SHEETS—SHEET 2.
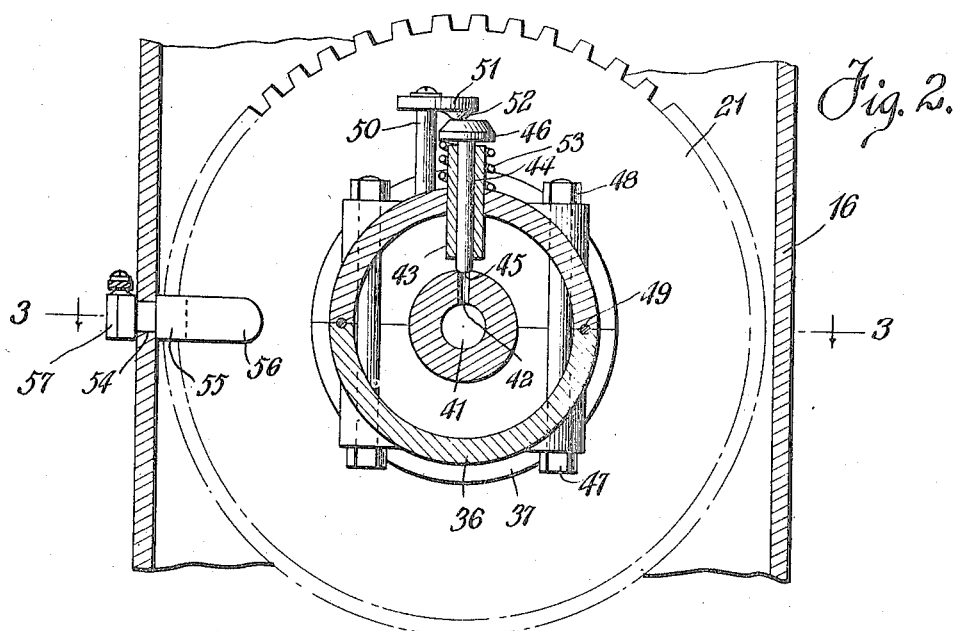
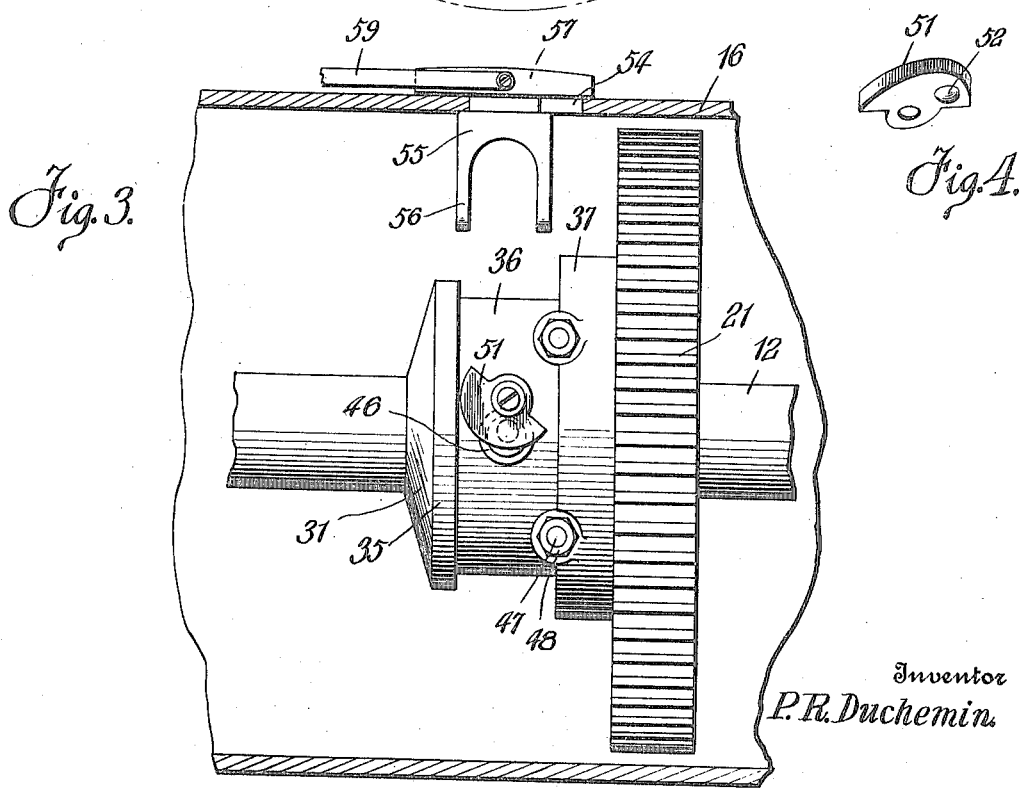
Inventor
P. R. Duchemin.

UNITED STATES PATENT OFFICE.

PETER R. DUCHEMIN, OF COLFAX, WASHINGTON.

SELECTIVE SPEED-GEARING.

1,248,635.          Specification of Letters Patent.     Patented Dec. 4, 1917.

Application filed May 29, 1916. Serial No. 100,686.

*To all whom it may concern:*

Be it known that I, PETER R. DUCHEMIN, a citizen of the United States, residing at Colfax, in the county of Whitman and State of Washington, have invented certain new and useful Improvements in Selective Speed-Gearings, of which the following is a specification.

My invention relates to new and useful improvements in transmission gearings, the primary object of my invention being the provision of a hydrostatic transmission gearing particularly adapted for motor vehicles.

A still further object of my invention consists in providing a transmission gearing in which all the gears are constantly in mesh with each other, certain of the gears being capable of being selectively locked to or disengaged from their shaft by hydrostatic means.

In this connection, a still further object of my invention consists in mounting a plurality of hydrostatically controlled clutches upon the shaft leading from the motor of the vehicle, each of these clutches including a gear normally loose upon the shaft and at all times meshing with a gear fixed upon the drive shaft leading to the differential housing of the vehicle.

Each of these clutches includes a liquid containing chamber communicating through a valve with a reservoir or pressure chamber formed in the shaft, and a still further object of my invention consists in novel means for selectively increasing or decreasing the liquid pressure in any one of these chambers to cause the clutch having such chamber to operate.

With these and other objects in view, my invention will be more fully described, illustrated in the acompanying drawings, and then specifically pointed out in the claims which are attached to and form a part of this application.

In the drawings:

Fig. 2 is a transverse vertical sectional view taken on the line 2—2 of Fig. 1, looking in the direction of the arrows;

Fig. 3 is a fragmentary sectional view taken on the line 3—3 of Fig. 2, looking in the direction of the arrows;

Fig. 4 is a perspective view of one of the valve controlling cams employed in my transmission mechanism.

Corresponding and like parts are referred to in the following description and indicated in all the views of the drawings by the same reference characters.

Figure 1:
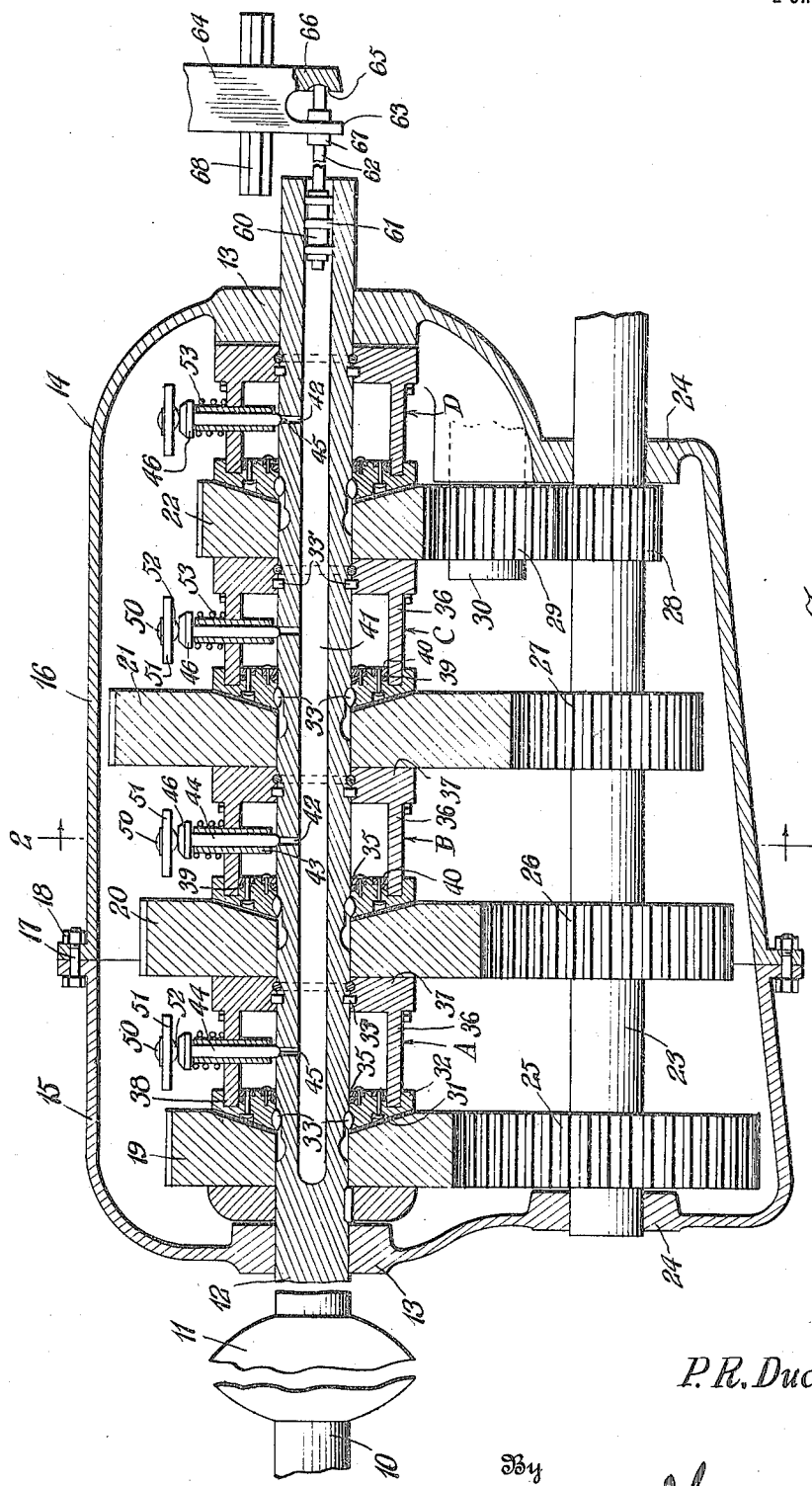
Figure 1 is a central longitudinal vertical sectional view through the transmission gearing constructed in accordance with my invention.

Referring more specifically to Fig. 1, 10 indicates a shaft leading from the main shaft of the vehicle and connected by a universal joint 11 to a shaft 12 journaled in bearings 13 formed in the front and rear ends of a transmission gearing housing 14 including the forward section 15 and rear section 16 having mating flanges to receive bolts 17 provided with nuts 18. Mounted upon this shaft 12 are a plurality of clutches A, B, C and D, each of which includes a spur gear, the spur gears being indicated at 19, 20, 21 and 22. A shaft 23 is also journaled in alined bearings 24 formed in the housing and vertically below the bearings 13 and extends rearwardly of the housing, constituting in fact the drive shaft of the vehicle. Fixed upon this shaft are the spur gears 25, 26 and 27 which mesh with the gears 19, 20 and 21 and a spur gear 28 which meshes with an idler spur gear 29 carried by a stub shaft 30 and meshing with the spur gear 22. All of the spur gears upon the shaft 12 are loosely mounted upon the shaft, although held against longitudinal movement, as will be later explained and it will, therefore, be apparent that power may be transmitted from the shaft 12 to the shaft 23 at different speed ratios, depending upon which of these gears is fixed to the shaft 12 by means of its co-acting clutch member.

Each of the clutch members, with the exception that the gears differ in size, is identical in construction with the others and a description of one will suffice for both. Each clutch member includes a spur gear, previously designated, which is formed in one side with a frusto-conical recess 31 to provide one member of a cone clutch, the other member, which is indicated at 32, being in the form of a disk fixed upon the shaft 12 by a key 33 and having a frusto-conical face corresponding to the face 31 and engageable therewith. The opposite face of the clutch member 32 is provided about the shaft with a peripheral channel to receive a packing ring 34 and retaining ring 35. A pressure chamber, in the form of a hollow cylinder 36, is fixed to the shaft by the dowel keys 33′ and is provided at one end with an integrally formed head 37 and has its opposite open end seated in an annular chamber 38 formed in the adjacent face of the clutch member 32, a packing ring 39 and retaining ring 40 serving, in connection with the packing ring 34, to prevent any leakage of liquid from the pressure chamber.

The shaft 12 is formed with an axial bore 41 providing an equalizing chamber or reservoir opening through the rear end of the shaft and extending throughout the length of the transmission housing and with radial passages 42 establishing communication between this bore and each of the pressure chambers 36. The peripheral wall of each pressure chamber is formed with an opening to receive a radially extending sleeve 43' and fitting closely within these sleeves are valve stems 44, the inner ends of which are shaped to provide needle valves 45 for controlling passage of liquid through the passages 42. The outer ends of the valve stems 44 are provided with frusto-conical heads 46. Preferably, the pressure chambers 36 are formed in symmetrical sections, as shown in Fig. 2, secured about the shaft by tie bolts 47 and nuts 48, packing strip 49 being seated between their mating edges to prevent leakage. The above described structure constitutes the hydrostatic clutch member proper and I will now describe the means for controlling such clutch members.

A stud 50 extends from each pressure chamber in parallel spaced relation to the valve stem 44 and at its free end carries a substantially segmental shaped turn button or cam 51 mounted for swinging movement in a plane at right angles to the axis of the valve stem and formed upon its lower face with a cam shoulder 52 which, when swung to engage against the head 46 of the valve stem, holds the valve in closed position. A helical spring 53, surrounding the outer end of the sleeve 43 and engaging the head of the valve stem, tends to hold the valve in open position in any other position of the cam 51. This cam is so proportioned that some part of it always engages the head of the valve stem and so prevents displacement of the valve.

The housing 14, at one side, and preferably in the same horizontal plane with the shaft 12, is formed opposite each of the clutches A, B, C and D with a longitudinal slot 54 in which is reciprocally mounted a plate 55 provided at its inner end with spaced fingers 56 adapted to engage one with one wing of the cam and one with the other wing of the cam, dependent upon the forward or rearward position of the plate 55 to turn the cam to close the valve or permit its opening. This plate, at its outer end, is provided with a head 57 which, at all times, closes the slot 54. A link 59 is connected to this head and may be connected to any suitable lever or other mechanism by means of which the plate may be reciprocated.

Fitting within the bore 41 of the shaft 12, is a piston 60 having packing rings 61 to prevent escape of liquid from the equalizing chamber formed by the bore. This piston is provided with a piston rod 62 which extends through one arm 63 of a slide 64 and has its opposite end journaled in a concavity 65 formed in the other arm 66 of the slide. Thrust collars 67 engage against opposite sides of the arm 63 and serve to hold the piston rod 62 against longitudinal movement, save for movement of the slide 64, while leaving it free to rotate with the piston shaft 12. The slide 64 is mounted for reciprocation upon any suitable guideway 68 and may be operated by means of a hand lever, foot pedal or other means to cause reciprocation of the piston in the bore 41.

In describing the operation of my improved transmission gearing, I will assume that the clutch gears 19, 20, 21 and 22 constitute the low, intermediate, high and reverse speed gears of the transmission mechanism and that in normal position all of the valves 45 of the clutches A, B, C and D are opened and that the clutch members 32 are out of engagement with their respective gears. Under these circumstances, when the engine is started, the shaft 12 will be driven, together with the pressure chambers 36 and clutch members 32, the gears of the clutch members, however, remaining stationary due to their being in mesh with the gears of the drive shaft 23 and due to the fact that they are not locked to the shaft 12. All of the pressure chambers, as well as the equalizing chamber or bore 41, are filled with any suitable non-compressible liquid, such as an oil. When the vehicle is to be started, the valves of the clutch members B, C and D will be closed and the piston 60 will be moved forwardly to compress the liquid thus trapped in the equalizing chamber 41 and force a portion of it into the pressure chamber of the clutch A. The increase in pressure of the liquid in this chamber will, as a result, move the clutch member 32 into engagement with the gear 19 to lock this gear to the shaft 12 when power will be transmitted from the shaft 12 through the gears 19 and 25 to the drive shaft 23.

When sufficient vehicle speed has been attained, the clutch A may be released by opening its valve and moving the piston 60 rearwardly to decrease the pressure in the equalizing chamber 41 and permit liquid to flow from the pressure chamber to the clutch A back into the equalizing chamber.

When this clutch A has been thus released, its valve is again closed and the valve of the clutch B is opened and the piston again moved forwardly to create an excessive pressure in the pressure chamber of the clutch B and so lock its gear 20 to the shaft 12. In like manner, the clutches C and D may be locked to the shaft under suitable circumstances.

It will, of course, be understood that various means for controlling the sliding plates which operate the valves and for controlling the slide 64 which operates the piston may be provided and that numerous changes in details of construction may be made. I therefore reserve the right to make any changes, within the scope of the appended claims, without in any way departing from the spirit of my invention.

Having thus described the invention, what is claimed as new is:

1. A transmission gearing including an engine driven shaft provided with an axial chamber opening through one end and with passages extending radially from the chamber through the shaft, a drive shaft, gears fixed on the drive shaft, gears loosely mounted on the driven shaft and meshing with those of the drive shaft and each constituting a clutch element, co-acting clutch elements mounted upon the driven shaft and movable into engagement with the gears to lock them to the driven shaft, a plunger mounted in the chamber, and means controlled by the plunger for selectively moving the clutch elements, said means including housings fixed about the driven shaft and each forming with one of the clutch elements a pressure chamber in which the clutch element constitutes a movable wall, each of the pressure chambers being in communication with the chamber of the driven shaft through one of the passages, and valves controlling flow of liquid through such passages.

2. A transmission gearing including an engine driven shaft provided with an axial chamber opening through one end and with passages extending radially from the chamber through the shaft, a drive shaft, gears fixed on the drive shaft, gears loosely mounted on the driven shaft and meshing with those of the drive shaft and each constituting a clutch element, co-acting clutch elements mounted upon the driven shaft and movable into engagement with the gears to lock them to the driven shaft, a plunger mounted in the chamber, and means controlled by the plunger for selectively moving the clutch elements, said means including housings fixed about the driven shaft and each forming with one of the clutch elements a pressure chamber in which the clutch element constitutes a movable wall, each of the pressure chambers being in communication with the chamber of the driven shaft through one of the passages, valves controlling flow of liquid through said passages, and means for selectively opening and closing the valves.

3. A transmission gearing including an engine driven shaft provided with an axial chamber opening through one end and with passages extending radially from the chamber through the shaft, a drive shaft, gears fixed on the drive shaft, gears loosely mounted on the driven shaft and meshing with those of the drive shaft and each constituting a clutch element, co-acting clutch elements mounted upon the driven shaft and movable into engagement with the gears to lock them to the driven shaft, a plunger mounted in the chamber, and means controlled by the plunger for selectively moving the clutch elements, said means including housings fixed about the driven shaft and each forming with one of the clutch elements a pressure chamber in which the clutch element constitutes a movable wall, each of the pressure chambers being in communication with the chamber of the driven shaft through one of the passages, valves controlling flow of liquid through the passages, means for normally holding the valves in open position, and means selectively operable to close any valve or to permit its opening.

4. A transmission gearing including an engine driven shaft provided in one end with an axial chamber opening through such end and with passages extending radially from the chamber through the shaft, a drive shaft, gears fixed on the drive shaft, gears loosely mounted on the driven shaft and meshing with those of the drive shaft and each constituting a clutch element, co-acting clutch elements mounted upon the driven shaft and movable into engagement with the gears to lock them to the driven shaft, a plunger mounted in the chamber, and means controlled by the plunger for selectively moving the clutch elements, said means including housings fixed about the driven shaft and each forming with one of the clutch elements a pressure chamber in which the clutch element constitutes a movable wall, each of the pressure chambers being in communication with the chamber of the driven shaft through one of the passages, a valve controlling flow of liquid through the passage, means for normally holding the valves in open position, and means selectively operable to close any valve or to permit its opening, said latter means including cam members mounted for turning movement and constantly in operative engagement with the valves, and means coacting with each cam member movable to a position to cause turning of the cam member in one direction or to a position to cause turning of the cam member in the opposite direction.

5. A transmission gearing including an engine driven shaft and a drive shaft, gears loosely mounted on the engine driven shaft, gears fixed to the drive shaft and meshing with those of the driven shaft, clutches fixed to the driven shaft and coöperating one with each of the gears on said shaft, each clutch including a pressure chamber having a wall movable into and out of locking engagement with the co-acting gear, the driven shaft being formed with an equalizing chamber and with passages establishing communication between the equalizing chamber and the several pressure chambers, a piston movable in the equalizing chamber, means for moving the piston, and a plurality of valves each controlling flow of liquid between the equalizing chamber and one of the pressure chambers.

6. A transmission gearing including an engine driven shaft and a drive shaft, gears loosely mounted on the engine driven shaft, gears fixed to the drive shaft and meshing with those of the driven shaft, clutches fixed to the driven shaft and coöperating one with each of the gears on said shaft, each clutch including a pressure chamber having a wall movable into and out of locking engagement with the co-acting gear, the driven shaft being formed with an equalizing chamber and with passages establishing communication between the equalizing chamber and the several pressure chambers, a piston movable in the equalizing chamber, means for moving the piston, and a plurality of valves each controlling flow of liquid between the equalizing chamber and one of the pressure chambers, each of the valves having a stem extending radially with respect to the driven shaft, and means operable through engagement with abutments for selectively opening and closing the valves.

7. A transmission gearing including an engine driven shaft and a drive shaft, gears loosely mounted on the engine driven shaft, gears fixed to the drive shaft and meshing with those of the driven shaft, clutches fixed to the driven shaft and coöperating one with each of the gears on said shaft, each clutch including a pressure chamber having a wall movable into and out of locking engagement with the co-acting gear, the driven shaft being formed with an equalizing chamber and with passages establishing communication between the equalizing chamber and the several pressure chambers, a piston movable in the equalizing chamber, means for moving the piston, and a plurality of valves each controlling flow of liquid between the equalizing chamber and one of the pressure chambers, each of the valves having a stem extending radially with respect to the driven shaft, and means operable through engagement with abutments for selectively opening and closing the valves, said means including cams constantly engaging the valve stems and adapted to be turned in one direction to close the valves and in the opposite direction to permit their opening, and springs for normally holding the valves in open position.

8. In a transmission gearing, a driven shaft having an axial chamber and a radial passage opening through the shaft from the chamber, a gear loosely mounted on the shaft, a clutch, including a compression chamber communicating with the axial chamber through the passage, for locking the gear to the shaft, means for selectively shutting off or permitting communication through the passage, a plunger operable in the axial chamber, a second shaft, and a gear fixed to the second shaft and meshing with the first gear.

9. A transmission gearing including an engine driven shaft provided with an axial chamber opening through one end and with passages extending from the chamber through the shaft, a drive shaft, gears fixed to the drive shaft, gears loosely mounted on the driven shaft and meshing with the gears of the drive shaft, means including compression chambers in communication with the passages for locking the gears of the driven shaft to their shaft, a plunger reciprocally mounted in the axial chamber for creating pressure in the pressure chambers, and means for selectively determining which pressure chamber shall be subject to pressure thus created.

10. A transmission gearing including an engine driven shaft provided with an axial chamber opening through one end and with passages extending from the chamber through the shaft, a drive shaft, gears fixed to the drive shaft, gears loosely mounted on the driven shaft and meshing with the gears of the drive shaft, means including compression chambers in communication with the passages for locking the gears of the driven shaft to their shaft, a plunger reciprocally mounted in the axial chamber for creating pressure in the pressure chambers, and valves coöperating with the passages to selectively shut off and establish communication between the axial chamber and the several pressure chambers.

In testimony whereof I affix my signature.

PETER R. DUCHEMIN. [L. S.]

Witnesses:
J. N. PICKRELL,
HELEN TROY.